UNITED STATES PATENT OFFICE.

ALLSTON SARGENT, OF NEW YORK, N. Y.

PLASTIC.

No. 882,538.      Specification of Letters Patent.      Patented March 17, 1908.

Application filed November 29, 1907. Serial No. 404,382.

*To all whom it may concern:*

Be it known that I, ALLSTON SARGENT, a citizen of the United States, residing at New York, in the county of New York and State of New York, have invented certain new and useful Improvements in Plastics, of which the following is a specification.

My invention relates to plastics and more particularly to an art method or process of manufacturing receptacles such as boxes, bins, cans and linings for various uses.

The principal objects are to form quickly, cheaply and economically such articles as mentioned so that they will have smooth interiors and be impervious to moisture and gases and particularly non-conductors of heat. These objects are obtained by the process as hereinafter set forth and claimed.

The preferred composition employed consists of an intimate mixture of hydraulic lime or cement such as Portland cement, comminuted material such as granulated or broken cork and water. These ingredients are mixed together and pressed into a suitable mold while at normal atmospheric temperature. The mold consists of a box open at the top and a smaller core resting on the bottom of the box. The wet plastic mass is pressed around the sides of the core and over the top so that the receptacle is formed mouth downward. After setting for 36 to 48 hours the article is removed from the mold and coated or enameled on the interior as desired.

The cement should be of such a character as to form upon setting a hard, durable stone-like mass. A small percentage of sand may be mixed with the cement if desired but the results are not quite so good. Sufficient cement is used not only to coat the particles of cork and cause them to adhere and form a unitary structure but to provide an excess which may settle toward the core of the mold so that the interior of the article formed is nearly solid cement, or cement and sand and consequently hard and dense. Sufficient water is used to give the desired degree of plasticity and yet permit the particles of cement to settle down between the lighter particles of cork. If desired, chemicals such as alum may be contained in solution in the water or mixed with the cement for producing colloidal effects and improving the impermeability of the product. The cork or other light insulating material has a tendency to rise in the mold so that a preponderance of the insulation is at the exterior of the product. The largest particles of cork tend to come nearest the exterior, while the finest particles of cement settle toward the interior before hardening. The receptacle is thus made hard, dense and smooth at the interior; where the contained articles come in contact with it and its insulating properties increase toward the exterior. When the cement employed does not give the finish desired, one or more coats of enamel may be applied and repair of the receptacle is rendered expeditious.

What I claim is.

1. The art of forming receptacles which consists in mixing cement, granulated cork and water in proportions to form a somewhat fluid but plastic mass, molding the same on a core so that the cement settles towards the core and forms a relatively hard and dense interior surface for the receptacle.

2. The art of forming receptacles which consists in mixing cement and particles of lighter material with water in such proportions as to produce a consistency permitting the cement to settle and the lighter material to rise, molding the mixture and then allowing it to set.

3. The art of forming plastic receptacles which consists in mixing a material such as hydraulic cement with a comminuted material of irregular sized and shaped particles and water in such proportions as to produce a somewhat fluid mass, casting the same in a mold over a smooth core, so that the finer particles of the mixture settle toward the core, allowing the same to set and become hard, removing the hard receptacle and then coating it on the interior with a preparation, impervious to gas and water.

In testimony whereof I affix my signature in presence of two witnesses.

ALLSTON SARGENT.

Witnesses:
ROBT. S. ALLYN,
ARTHUR M. NELSON.